Feb. 12, 1935.  J. L. H. HAND  1,990,940

COMPENSATION DEVICE FOR COMPASSES

Filed Feb. 21, 1928  3 Sheets—Sheet 1

Inventor
John L. H. Hand

Feb. 12, 1935. J. L. H. HAND 1,990,940
COMPENSATION DEVICE FOR COMPASSES
Filed Feb. 21, 1928 3 Sheets-Sheet 2

Inventor
John L. H. Hand.
by Wm Steell Jackson
Attorney

Witness:
Walter Chion

Feb. 12, 1935.   J. L. H. HAND   1,990,940
COMPENSATION DEVICE FOR COMPASSES
Filed Feb. 21, 1928   3 Sheets-Sheet 3

Inventor
John L. H. Hand
by
Attorney

Witness:
Walter Chism

Patented Feb. 12, 1935

1,990,940

UNITED STATES PATENT OFFICE 1,990,940

COMPENSATION DEVICE FOR COMPASSES

John L. H. Hand, Bala-Cynwyd, Pa.

Application February 21, 1928, Serial No. 255,907

27 Claims. (Cl. 33—225)

My invention relates to a device for neutralizing distortions in the earth's magnetic field at a compass fixed on a carrier that may be a ship, air craft or land vehicle, the distortion being due to magnetic material in the carrier and unless neutralized variably upsetting the accuracy of the compass when the direction of alinement of the carrier with respect to the magnetic meridian is varied.

A purpose of my invention is to provide novel means for the easy neutralization at a compass of the magnetic field of the carrier of the compass, the compass being fixed to definite place on the carrier which may be a ship, air craft or vehicle.

A further purpose is to fix four magnets with their poles in the sides of a square preferably symmetrical about the axis of the square, and with unlike poles adjacent so that the circuit is normally through the magnets in series, and to span each pair of magnets with an armature, controlling an outside magnetic effect in two relatively perpendicular directions by proper adjustment of the respective armatures along the magnets that they span.

A further purpose is to reduce any reaction upon one set of relatively corrective adjustable magnets and armatures by reason of the adjustment of the other set by making the adjustable member of one set continuously substantially perpendicular to the magnetic field of the other set and the range of travel of the adjustable member small.

A further purpose is to provide relatively perpendicular sets of relatively adjustable corrective magnets, each set comprising parallel magnets and an intermediate parallel armature, the magnets and the armature being relatively adjustable transversely. I preferably make the distance between the coupled pair of magnets quite small but optionally may make this distance considerable, depending largely upon the accuracy of adjustment contemplated.

A further purpose is to use relatively perpendicular sets of relatively adjustable magnets and armatures in which each set comprises two alined and opposing pairs of magnets each pair being variantly coupled with an armature, with corresponding variant coupling of the other pair by another armature. I vary magnetic effect of each set by varying the couplings of its alined magnets by relative adjustment of the armatures of the spaced and alined opposing pairs with respect to the pairs, as by means of adjusting either the spaced pairs or the spaced armatures longitudinally of the length of the magnets in opposite directions. By opposing the alined pairs of each set I obtain a minimum inter-reaction between the relatively perpendicular sets, so that adjustment of either set has minimum effect upon the magnetic field produced at the compass by the other set.

A further purpose is to provide convenient and visible means upon the outer portion of the bowl of a compass for correcting the magnetic field distortion at the compass due to structure in the carrier of the compass, and to provide scales upon the outer portion of the bowl showing the degrees of the different adjustments.

A further purpose is to provide an advantageous mounting for relatively perpendicular pairs of stationary magnets and cooperating movable armatures or yokes adapted to modify the magnetic field around a compass in relatively perpendicular directions. I mount the magnets in depressions of similar plates and mount an armature or yoke and a rotatable screw threading the armature upon the back of each plate, the angular movements of the screws controlling the magnetic adjustments.

Further purposes will appear in the specification and in the claims.

I have elected to show a few forms only of my invention, and have selected forms that are practical and efficient in operation and which illustrate particularly well the principles involved.

Figures 16 and 17 the operation of the form shown in Figure 9, and Figure 18 the operation of the form shown in Figure 2.

Like numerals refer to like parts in all figures.

Describing in illustration and not in limitation and referring to the drawings:—

Magnetic compasses aboard ship and air craft or the like give indications in accord with the direction of the magnetic field at the compass, which is the resultant of the earth's magnetic field and a magnetic field due to magnetic material in the carrier.

The field due to the magnetic material in the carrier is directionally variant according to the variant angular alinement of the carrier with the magnetic meridian and must therefore be neutralized at the compass to avoid an error in the reading of the compass that will be variant with the change in directional alinement of the carrier.

The usual way of neutralizing the field of the carrier at the compass is to neutralize the east and west component of the field of the carrier when the carrier alinement is in one direction, then change the alinement of the carrier ninety degrees and neutralize the new east and west component of the carrier field.

I provide a magnetic system beneath the compass that is adapted to be modified in so far as it magnetically affects the magnetic field at the compass in relatively normal horizontal directions by shifting movable armatures or yokes with respect to magnets, or vice versa shifting movable magnets with respect to armatures.

Figure 1:
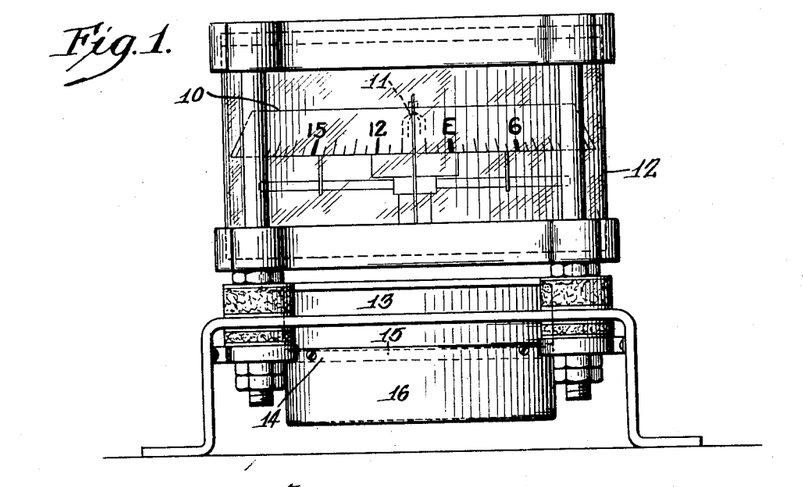
Figure 1 is a front elevation showing a compass bowl for use upon an air craft or the like and having my field adjustment device applied to its base.

Figure 1 illustrates a well-known type of compass bowl that is frequently used on air craft.

The rose 10 is pivoted on a central spindle 11 inside the bowl 12 which is filled with liquid and provided with the usual expansion chamber 13 shown beneath the bowl to permit variation in volume of the liquid incident to varying temperatures.

Figure 2:
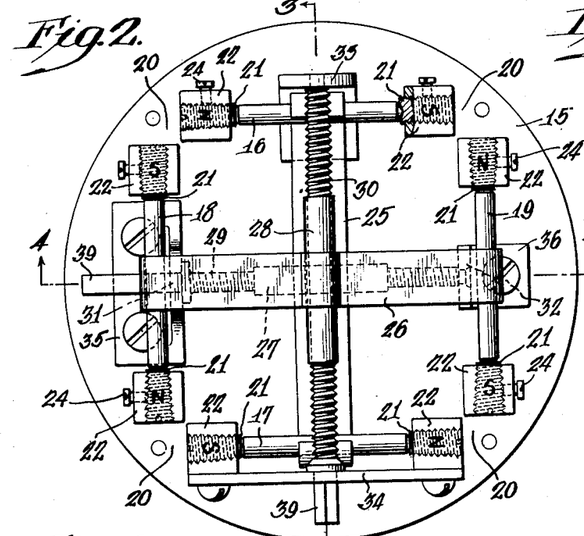
Figure 2 is an enlarged bottom plan view of structures shown in Figure 1 with the cap removed to show my field corrective device.
Figure 3:
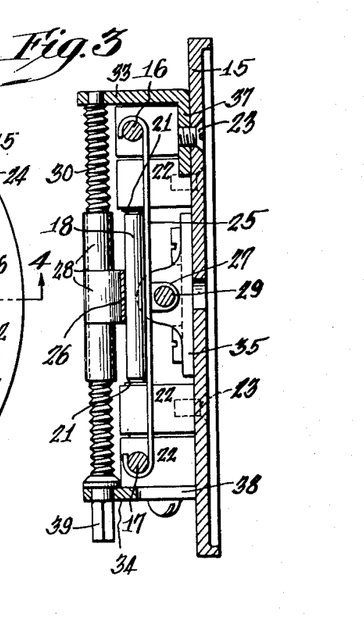
Figure 3 and 4 are vertical sections taken upon lines 3—3 and 4—4 respectively of Figure 2 looking in the direction of the arrows.
Figure 4:
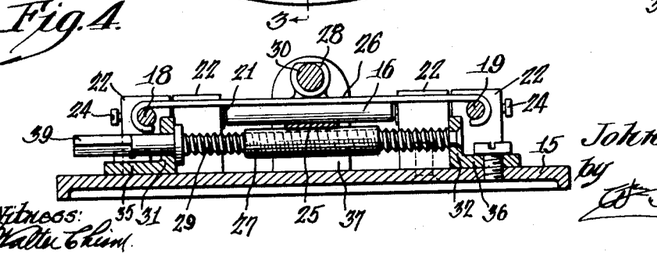
Figures 5, 8:
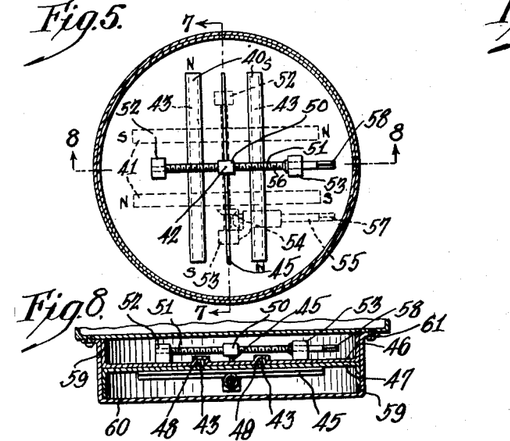
Figures 5 and 6 are bottom plan and side elevations of another desirable commercial form for the corrective unit, which as shown is adapted to be fastened upon the bottom of a compass bowl or inside a binnacle.
Figures 7 and 8 are sections taken upon the lines 7—7 and 8—8 respectively of Figure 5, looking in the direction of the arrows.

I have mounted my device below the expansion chamber at 14 on a disc 15 that replaces a usual bottom cover of the expansion chamber, and cover the device with a cap 16. In Figures 2 to 4 the cap 16 has been removed in order to show one form of my mechanism that has some advantages.

The disc 15 is of non-magnetic material and is adapted to fit over and fasten to place on the bottom of the expansion chamber concentric with the vertical axis of the rose.

I mount two pairs of parallel bar magnets 16 and 17 and 18 and 19 on the lower side of the disc.

The magnets of each pair are alike in dimensions and magnetic strength and are relatively symmetrical with respect to the vertical axis of the compass.

Preferably the pairs are also alike so that the magnets lie in the sides of a square and symmetrically about the central axis of the square which also preferably coincides with the vertical axis of the compass.

The magnets are spaced from the corners of the square, with unlike poles adjacent, forming as it were a single magnetic circuit with four gaps 20 of non-magnetic material (as of air or brass) located symmetrically about the central axis.

In Figures 2 to 4 the opposite ends of each magnet are supported in the recessed ends of screws 21 that are alined with the magnet and threaded through the outer ends of posts 22. The posts extend downwardly from the disc, to which they are fastened as by screws 23. The screws 21 supporting the magnets are shown locked by suitable transverse screws 24.

Upon the upper side of one pair of magnets and upon the lower side of the other pair I provide an armature spanning the magnets and adapted to longitudinal adjustment along the lengths of the magnets, the upper and lower armatures 25 and 26 respectively being preferably alike.

Each armature, which is desirably of soft iron or of a magnetic alloy of high permeability, is mounted upon a nut 27 or 28 that is threaded upon a rotatable rod 29 or 30. The armatures are perpendicular to one another and to the magnets they span and magnetically connect the magnets of the individual pairs at variable positions along their lengths. The nuts and threaded rods are axially parallel to the magnets and are vertically offset midway between the magnets of the respective pairs.

The threaded rods 29 and 30 carrying the armatures on the nuts are rotatably mounted in suitable bearings 31, 32 and 33, 34 on opposite sides of the disc, upon the brackets 35, 36 and 37, 38.

Each bar presents a non-circular shank 39 for rotation by a suitable key, not shown.

Desirably one set of magnets is alined fore and aft with the carrier, which may be ship, air craft or land vehicle, making the other set alined athwart the carrier.

In this arrangement the carrier is alined fore and aft with the magnetic meridian while making one adjustment and fore and aft east and west while making the other.

Obviously it is the alinement of one of the sets of stationary magnets to produce an east and west effect on the magnetic field at the compass with the other set alined to produce a field in the magnetic meridian, that is material during any adjustment rather than the alinement of the carrier but I find the induced fields at the compass are alined with the pairs of magnets and for greater convenience I make the alinement of the magnets of one set the same as that of the fore and aft alinement of the carrier and the other set athwart the carrier.

I find the magnetic effect at the compass of each pair of magnets is dependent on the position of the armature along the magnets.

When the spanning armature is midway between opposite ends of the magnets the effect at the compass is substantially zero and I find an increasingly greater effect at the compass is produced by moving the by-passing armature away from its mid and neutral positon, the effect being in opposite directions at the compass when the movement is in one direction when it is in the other, and directionally substantially alined with the magnets.

In operation assuming the sets aline respectively fore and aft and athwart the carrier, the carrier field at the compass is corrected as follows:—

The carrier is set in fore to aft alinement with the magnetic meridian and the armature of the fore and aft set of magnets is adjusted by suitable rotation of its threaded rod at the keyhold 39 until the compass indicated north. The carrier is then turned ninety degrees so that it is fore to aft east or west and the spanning armature of the athwart set of magnets is adjusted until the compass correctly indicates east or west as the case may be, which completes the field correction.

Figures 5 to 8 show another arrangement for the sets of adjustably paired magnets that is perhaps superior to that of Figures 2 to 4 in its substantially complete independence between the two sets of paired magnets, and also show a desirable commercial mounting well adapted to either the arrangement of magnets about to be described or to that in which the four magnets are in the sides of a square as in Figures 1 to 4 already described.

When the ship is alined fore and aft with the magnetic meridian and adjustments are made in the Figures 2–4 form, the armature upon the fore and aft set of magnets is the one under adjustment. On the other hand in Figures 5–8 form the armature upon the athwart set of magnets is the one to be adjusted. On the other hand, when the ship is alined fore and aft east and west in the same way, the armature to be adjusted in the form of Figures 2–4, is that of the athwart set of magnets, while in the Figures 5–8 form it will be the armature of the fore and aft set of magnets. In both cases the adjustment of any set should affect the strength but not the direction of field from the set under adjustment and also should have substantially no effect upon the field from the other set of coupled magnets.

In the structures of Figures 5–8 and 9, I obtain a very great independence between the two systems by mounting the relatively perpendicular sets of coupled pairs so that the adjustable armatures of each set are continuously substantially perpendicular to the magnetic field from the other set and also by making the ranges of adjustments of the armatures very small in actual distance.

Figure 9:
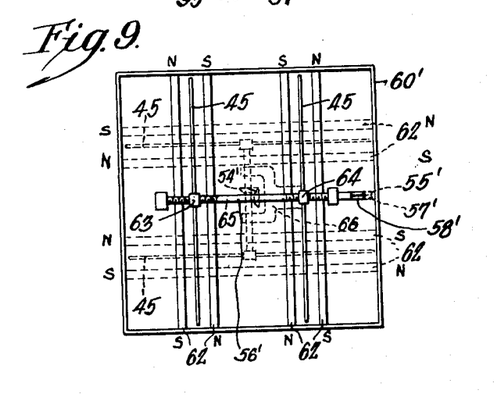
Figure 9 is a modification of the form shown in Figures 5 to 8, the view being a bottom plan view corresponding to Figure 5 of the earlier form.

In Figures 5–8 each set comprises a single pair of coupled magnets on opposite sides of a central axis 42 through the compass, while in Figure 9 each set comprises two pairs, the pairs being spaced upon opposite sides of the axis 42 through the compass.

Each set of adjustably paired magnets comprises relatively parallel bar magnets 43 and 44 exactly similar and with unlike poles adjacent, and an intermediate armature 45. The magnets are parallel to one another and to the intermediate armature 45, which is laterally adjustable so as to vary the relative distance between the armature and the respective magnets of the pair.

Both the magnets and the intermediate transversely adjustable armature between the magnets of either set are continuously perpendicular to the magnets and armature of the other set, and the range of adjustment of the armature is desirably quite small, perhaps not over one-quarter inch altogether although optionally to meet special conditions or individual views the distance may be made much greater than this.

I have preferred to make the two sets, except as to their 90° angular alinement with one another, exactly alike, although this is not at all essential.

The sets of paired magnets 43 and 44 are mounted between discs 46 and 47 in suitable grooved recesses 48 or 49 of the discs, the magnets of one set being mounted in groove recesses 48 of the disc 46 and those of the other set in the grooved recesses 49 of the other disc.

The discs are made of non-magnetic sheet metal such as aluminum or brass and preferably stamped to form, but optionally machined, each disc carrying the armature or armatures of one set of paired magnets with suitable armature adjustment mechanism. The magnets lie thus in groove seats between the discs but the armatures 45 and their adjustment mechanism are preferably mounted on the outside of the discs.

I support and position each armature 45 by one or more suitable screw or screws rotatably mounted on the disc and show a single nut 50 at the middle of the armature and carried upon a rotatable threaded spindle 51 journaled in bearings 52 and 53.

If desired the single nut 50 may be replaced by a nut near each end of the supported armature mounted on rotatable spindles suitably geared together to operate as a unit, but the latter arrangement while being obviously stronger necessitates a somewhat more complicated supporting and operating mechanism.

It is usually more convenient to make both armature adjustments from the same side of the compass and I show for this reason one of the relatively perpendicular spindles 51 that respectively position the armature 45 as having bevel gear connection 54 to a countershaft 55 parallel to the spindle 56 which is the other spindle 51.

Figures 6, 7:
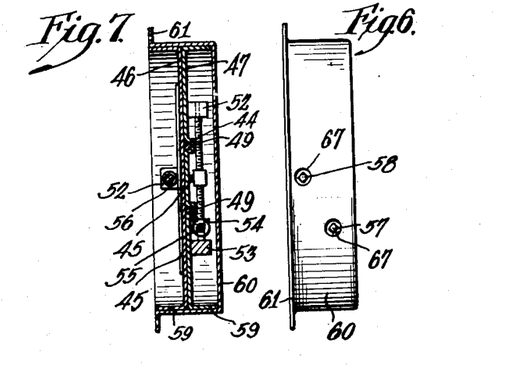

The countershaft 55 and the threaded spindle 56 each present squared ends 57 and 58 respectively for adjustments at the same side of the instrument, Figure 7.

The non-magnetic discs 46 and 47 are substantially counterparts with the grooved recesses of one at right angles to those of the other.

The different posts for supporting the bearings of the rotatable spindles carrying the nuts are desirably permanently fastened to the outside of the respective sheets. When the sheets are separated these bearings and the mechanism adjustably supporting the armature of one set are on the outside of each sheet, with the magnets of one set lying in the groove seats 48 of one disc while the magnets on the other set lie in the corresponding groove seats 49 of the other disc.

Each sheet is provided with a longitudinally extending peripheral flange 59, the flanges of the two sheets extending in opposite directions, and the two sheets fit inside a suitable cup-shaped cover 60 which is provided with a flange 61 for fastening to the bottom of the compass binnacle or the like.

The spacing between the magnets of the compass rose is usually considerably greater than that between the paired magnets 43 and 44. In the arrangement of Figures 5 to 8 adjustments are accompanied by a slight upsetting of magnetic symmetry with respect to the central axis 42, as lateral movement of one of the armatures 45 results in weakening the effective strength of a magnet on one side of the axis as compared to that on the other side of the axis, the pair under adjustment being set symmetrically with respect to the axis.

In the structure shown in Figure 9 I avoid this lack of magnetic symmetry and secure wider correcting fields at the compass by making each set comprise two pairs 62 of magnets, the pairs being upon opposite sides of and preferably symmetrical with respect to the axis 42 through the compass.

Each coupled pair 62 is provided with an intermediate armature 45 parallel to the magnets of the pair, and the armatures of the two pairs are adjustably supported upon nuts 63 and 64 threaded upon spaced portions of a threaded spindle 65, one of the nuts being preferably threaded right-hand and the other left-hand to maintain more perfect symmetry than would be the case if the nuts were both made right-hand or both left-hand.

Obviously, however, this is a matter that will usually be of only minor importance, but if the nuts are both right-hand or both left-hand the magnets should be placed so that at any end of a set the north poles of the spaced pairs will have the same distance between them as between the south poles at the same end of the set, instead of using the symmetrical arrangement shown in Figure 9; that is the magnets of one of the pairs of each set would be reversed in location from that shown in Figure 9.

I show one of the shafts 65 provided with a bevel gear connection 54' to a winding shaft 55' journaled in suitable bearings 66 and generally similar to the corresponding shaft 55 of the structure shown in Figures 5 to 8.

Both the countershaft 55' and the threaded spindle 56 are provided with squared ends 57' and 58' respectively for key adjustments at the same side of the instrument.

The shafts 55 and 56 in the form of Figures 5 to 8 are not conveniently placed in the same vertical plane, being, as illustrated, one in the middle and one a little offside, but the more symmetrical arrangement of Figure 9 permits the parallel shafts 55' and 56' to be vertically one above the other on the outside of the discs.

The casing 60' for holding the discs to place upon the bottom of the binnacle or upon supporting structure above or below a compass is generally similar to that shown in Figures 5 to 8 except that it is shown square instead of circular, this being obviously a mere matter of best adaptation to the compass structure, or to individual preference. The outer casings are shown with suitable key holes 67 in registry with the squared ends of the winding shafts.

Figures 10, 10A, 11, 12, 13, 14, 15, 16, 17, 18:
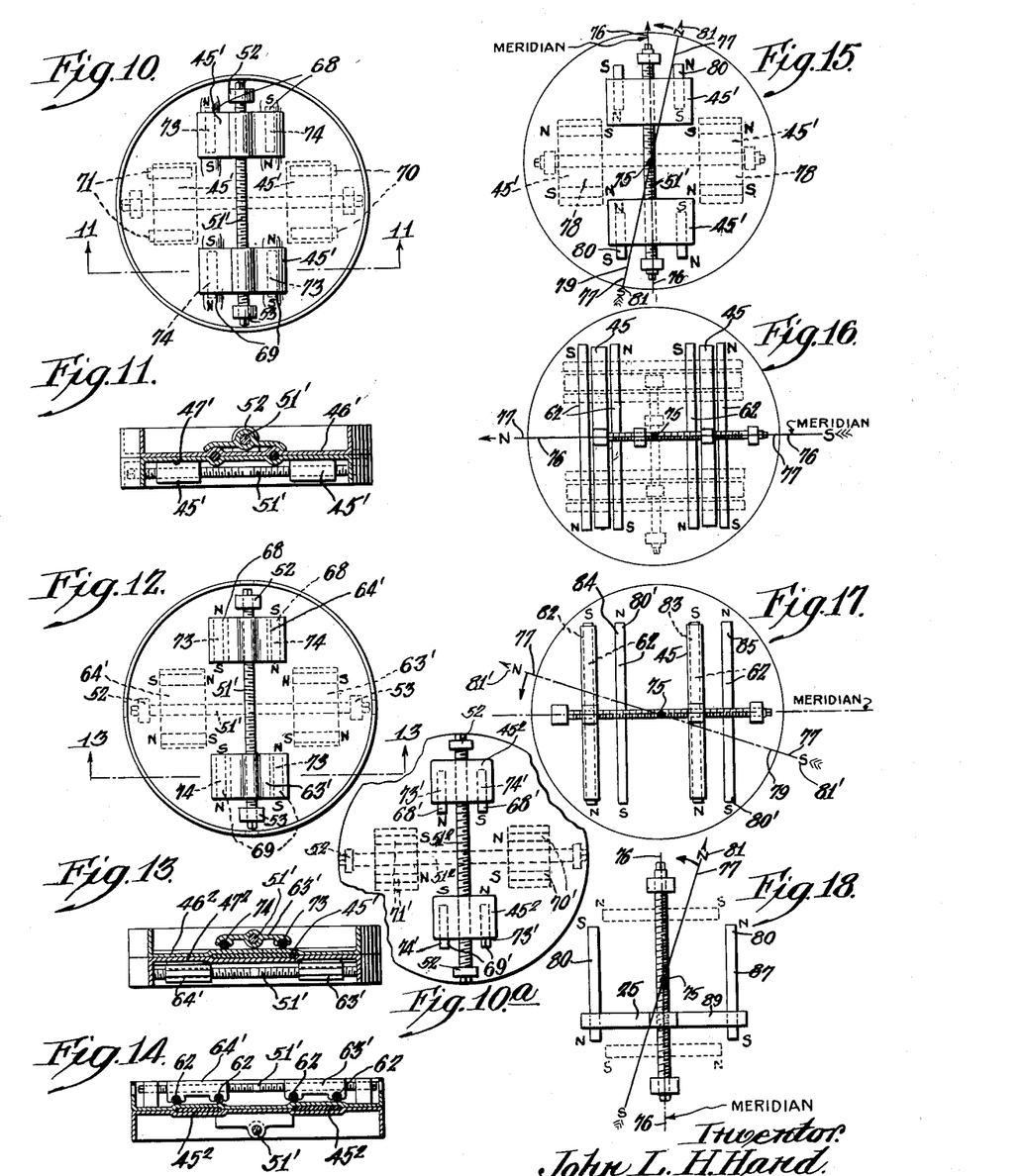
Figures 10 and 10a are plan views of particularly desirable forms in which each set is made up of two alined pairs of variantly coupled magnets, both forms having very great magnetic independence between the cooperating sets.
Figure 11 is a section on the line 11—11 of Figure 10.
Figures 12 and 13 are views generally similar to Figures 10 and 11 respectively showing a modification of the forms shown in Figures 10 and 11, the opposing pairs of magnets being movable in Figures 10 and 11 and their armatures movable in Figures 12 and 13.
Figure 14 is a vertical section showing a modification of the form of Figure 9.
Figures 15 to 18 are diagrammatic plan views illustrating the shifting of a compass reading into the north and south meridian by varying a magnetic coupling on different forms of my corrective device, Figure 15 illustrating the operating of the form shown in Figures 10 and 11.

I show in Figures 10 and 11 a particularly desirable form of my invention in which each one of the relatively perpendicular magnetic sets comprises two alined and opposing pairs of magnets, the pairs of one set being designated 68 and 69 and the opposing pairs in the other set being designated 70 and 71.

Each pair is variantly covered by a soft iron armature or yoke member 45'.

This arrangement is one which is particularly effective in avoiding inter-reaction between the magnetic effects of the two sets, in that a lower degree of care is required for making the sets mutually independent, the magnetic units not having to be so nearly equal in strength as in the forms already described.

In Figures 10 and 11 the opposing alined magnets 73 and 74 shown rigidly mounted between the discs 46' and 47' suitably recessed to receive the magnets and the armature members of the relatively perpendicular sets are mounted upon opposite sides of the combined disc unit.

A rotatable rod 51' mounted in bearings 52 and 53 has toward opposite ends right-hand and left-hand screw connections with the armatures or yoke members 45' of the alined opposing pairs of magnets.

In neutral position the yoke members 45' blanket or cover their respective pairs of magnets so that the magnetic field from each pair (as well as from the set comprising both pairs) is substantially zero.

By rotating the rod 51' the yoke members are screwed toward one another which progressively uncovers the outer ends of the two alined opposing pairs of the set with a resultant adjustable effect upon the field at the compass.

The field at the compass from the set is thus adjustably variant according to the position of the yokes 45' as determining the extent to which the outer ends of the pairs of opposing magnets are uncovered and free to act.

The method of operation for correcting the ship's field at the compass is exactly as already described for the other forms.

Figure 10a shows a desirable modification of the form shown in Figures 10 and 11.

In the Figures 10 and 11 form, the alined pairs of magnets of each set magnetically oppose and to considerable extent neutralize one another, which results in an extremely low inter-reaction at the compass between the relatively perpendicular sets of magnets. This arrangement however disadvantageously presents a lack of perfect magnetic symmetry, the outer poles of the adjacent magnets of the sets 68 and 71 (Figure 10) and of the sets 68 and 70 being of alike polarity while the outer poles of the sets 69 and 70 and of 69 and 71 are of unlike polarity.

The form shown in Figure 10a offers a more perfect magnetic symmetry than that of Figures 10 and 11.

In this form the alined pairs making up each set are placed so that they are magnetically in the same direction, the coupled pairs 68' and 69' presenting toward one another unlike poles. The armature members $45^2$ on the alined pairs are adjustable in the same direction, each being threaded by a right-hand or a left-hand screw member $51^2$, rotatably mounted in suitable bearings 52. The inner poles of one set uncover simultaneously with the outer poles of the other set and vice versa.

This arrangement I find to be one of exceptional excellence in the lack of necessity for avoiding extreme care in using magnets of exactly the same characteristics with respect to strength and location in order to be able to secure entire independence between the two sets.

The operation is exactly as already described for the form shown in Figures 10 and 11, the sets being preferably alined fore and aft and athwart the carrier.

Obviously either the magnets or their yokes may be moved to effect the relative adjustment between the two in order to adjustably vary the field from the set, and I show in Figures 13 and 14 two different types of these variations from the forms of Figures 10 and 9 respectively, differing in the directions in which the magnets are moved, in Figure 13 longitudinally of the magnet lengths and in Figure 14 transversely of their lengths.

The yoke members 45² are rigidly mounted between the counterpart discs 46' and 47' and the magnets are carried upon nut members 63' and 64' of the rotatable rods.

In this event the magnets are upon the outside of the discs and the armatures are clamped between the discs, the method of operation being exactly the same as in the other forms.

I show in Figures 15 to 18 inclusive diagrammatic illustration of the magnetic effects of several of the different forms upon a ship's field. In each of these figures the correcting device is supposed to be placed so that it has a central axis 75 through the compass. This axle shows as a point upon the figures and is perpendicular to the plane of each adjusting set of magnets.

Referring to Figure 15 (corresponding to the form of Figures 10 and 11) the true magnetic meridian is indicated by the line 76. If the ship has been alined so that the set of opposing pairs 68 and 69 of magnets is alined with the true meridian, and the compass needle 77 when the armatures 45' are in their neutral position (shown dot and dash at 78) gives a reading along the line 79 then the alined armatures 45' of the set would have to be adjusted toward one another by rotating the screw member 51' to suitably uncover the outer ends of the opposing pairs of magnets.

The adjustment inwardly of the armatures will result in repulsion between the unlike poles 80 and 81 of the magnets and compass respectively so as to drive the compass into alinement with the true and known meridian and the inward adjustment of the armatures is continued until they reach positions (shown full line) at which the compass needle gives an indication that is in accord with the known meridian.

Figures 16 and 17 illustrate diagrammatically the application of the form of corrective device of Figure 9.

If the ship has no field of its own and is alined so that the spaced sets 62 of magnets are at right-angles to the magnetic meridian the sets of armatures 45 intermediate the magnets will require to be in neutral position which is half way between the magnets as illustrated in Figure 16, in order that the magnetic needle 77 may coincide with the meridian 76, the effect of one magnet then neutralizing the effect of the other.

If the magnetic needle 77 after the ship has been alined so that the magnets are at right-angles to the true magnetic meridian shows an angular deflection from the true magnetic meridian as indicated by the dot-and-dash line 79 (Figure 17), then the armature members must be moved so as to gradually neutralize the external fields of the magnets 82 and 83 which tend to increase the deflection of the compass from the meridian while diminishing their neutralizing effect upon the magnets 84 and 85 which tend to drive the magnetic needle into the meridian.

The armatures 45 must be moved from their mid-position to some such position as that indicated in Figure 17 at which the greater strength of the magnets 84 and 85 will have forced the needle into the meridian, due to the repulsive action between the unlike poles 80' and 81' of the magnets and compass needle respectively, the position of the armatures being made such as to exactly bring the compass indication into known magnetic meridian.

Diagrammatic Figure 18 corresponds generally to the form of magnets shown in Figures 2 to 4.

Assuming that the ship has been alined so that fixed magnets 80 and 87 are in the known true magnetic meridian 76 and that with the movable armature 25 in neutral position (shown in dot-and-dash at 88) the compass needle 77 indicates a direction along a line 79 having an angular deflection with respect to the known meridian, then the armature 25 has to be moved into some such position as that shown in full line at 89 in order to drive the compass needle into coincidence with the magnetic meridian.

This is due, as before, to a progressively increasing repulsion between the unlike poles 80 and 81 of the magnets and compass needle respectively when the armature or yoke is moved away from its mid-position, until at some such position as that shown the needle and meridian are in coincidence.

It is to be understood that the location of the corrective mechanism is subject to considerable variation according to need or preference. I have illustrated it in the assembly Figures 1 and 20 to 22 as in each case placed beneath the expansion chamber of a compass.

Many compasses do not have expansion chambers and in many cases as with a type of air craft compass that reads on the side it may be more convenient to place the corrective mechanism above instead of below the compass.

The location of the corrective device should be that best adapted to the individual conditions but such as to make the device adapted to modify magnetic fields at the compass magnets in directions that are at right angles to one another and one adjustment should be substantially independent of the other.

Figure 20:
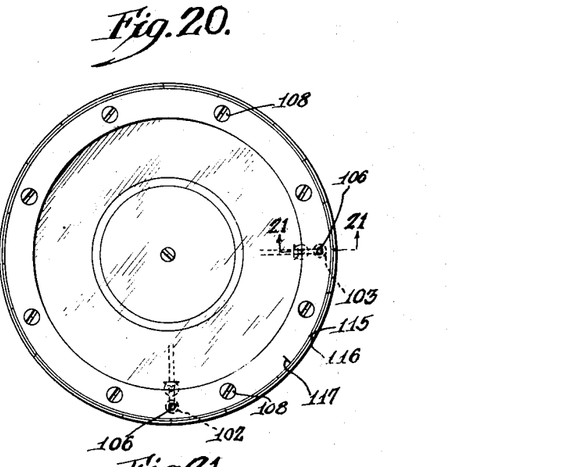
Figure 20 is a top plan view of Figure 19.
Figure 21:
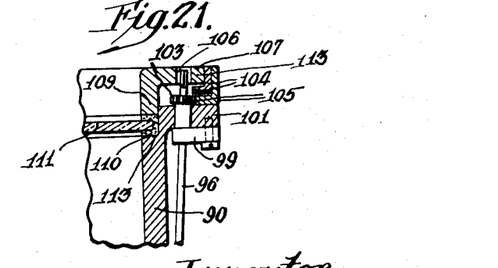
Figure 21 is a fragmentary section of Figure 20 taken upon the line 21—21.

I find it sometimes advantageous to make the adjustments at the outer portion of the bowl of a compass, particularly when the bowl has gimbal ring support, and also advantageous to give visible indication of the degrees of adjustment, and have embodied these features of my invention on the structure shown in Figures 20–22.

Figure 19:
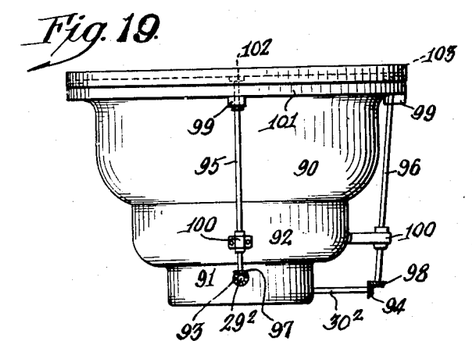
Figure 19 is a front elevation of the bowl of a ship's compass having my corrective device applied to it and adapted to have gimbal ring support in a binnacle.

In these figures I show the bowl 90 of a compass of the type having gimbal ring support, as used on ship board.

In use this type of bowl is mounted in a binnacle with gimbal ring connection between the bowl and binnacle adapting the compass to remain horizontal irrespective of slope variation in the binnacle, the compass bowl being weighted to remain horizontal and having in effect horizontal universal pivot connection to the binnacle.

My magnetic correcting device such as any of the forms already described is mounted at 91 on the bottom of the usual expansion chamber 92 of the bowl and preferably symmetrically with respect to the bowl axis. The member 91 of the drawings is intended for a conventional indication for any suitable magnetic corrective device adapted to modify the magnetic field at the rose in relatively perpendicular directions, by rotary adjustments of the rods 29² and 30².

I fasten pinions 93 and 94 on laterally extended shanks of the relatively perpendicular threaded adjustment rods 29² and 30² and make shaft and gear connection from these pinions for adjustment at the face of the bowl and gear connections to movable scales at the face of the bowl to indicate the settings of the two adjustment mechanisms.

Diagonal shafts 95 and 96 carry bevel pinions 97 and 98 in mesh with the pinions 93 and 94 on the threaded adjustment rods 29² and 30². The shafts 95 and 96 are journaled in lower and upper bearings 99 and 100 respectively fastened to the sides of the bowl and to the bottom of an outwardly extending flange 101 at the top of the bowl.

The diagonal shafts extend upwardly beyond their upper bearings, carry bevel pinions 102 and 103 that mesh respectively with the inwardly directed teeth of rotatably adjustable scale members 104 and 105, and are adapted to key adjustment through perforations 106 in the cover ring 107.

The cover ring 107 is a follower member screw clamped at 108 so that its inner downwardly extending flange 109 presses into a circumferential gasket 110 to seal the interior of the bowl from the atmosphere around the outside glass cover 111, which is supported on an upwardly directed seat 112 presented by the bowl.

The horizontal outwardly extending portion 113 of the ring 117 is normally spaced some distance above the upper surface of the bowl flange 101 and I make use of this space between the bowl flange and cover ring to receive the rotatable gear wheel scale members 104 and 105 operatively connected by bevel pinions 102 and 103 to the diagonal shafts 95 and 96.

Rotary movement of either diagonal shaft, by means of a key inserted in one of the openings 106 through the cover ring, changes the magnetic adjustment and correspondingly rotates the scale member.

Scale divisions 115 and 116 are cut around the top of the respective annular members 104 and 105 and the magnetic adjustments of both sets of magnets show simultaneously at these scales, as determined by the scale readings with respect to a suitable stationary zero mark 117 upon the top of the cover ring.

The operation for correcting the magnetic field of the carrier at the compass is exactly as already described except that the adjustments are made at the top of the bowl instead of at the bottom and that the settings of both adjustments are continuously indicated and indicated where they are readily visible to anyone reading the compass.

The continuous indication of the magnetic adjustments is frequently quite advantageous, in that the magnetic field at the compass will many times vary with the cargo on the carrier.

After a ship has taken cargo the compass is corrected by two adjustments with the ship alined east and west during one adjustment and north and south during the other.

When the cargo is removed the requisite readjustment may be simply that of changing the adjustments to values predetermined by earlier tests.

The visible indication of the magnetic adjustments also enables an operator or supervisor to tell definitely at a glance whether there has been any change in the adjustment of the compass.

Another advantage is a commercial one in that it permits the bowl and corrective device to be made up as a unit for use with any available gimbal ring and binnacle.

What I have variously called armatures and yokes perform the same function, differing merely in the distance of the magnetically permeable strip from the poles of the magnets and will be treated in the claims as armatures, since their movements relatively to the magnets in all cases vary the external fields of the magnets and hence vary their effects in compensation of the ship's field at the compass.

It will be obvious that all my forms have in common the adjustable shunting of the magnetic lines of force to varying degrees by a magnetically permeable body so as to adjust the stray field at the compass of one magnet or one set of magnets without affecting the stray field at the compass from another magnet or set of magnets, for the purpose of utilizing the stray fields thus regulated to correct or offset or neutralize the ship's field at the compass.

It will also be evident that whether the magnet or magnets, or the permeable body or both, be moved, the permeable body may lie across the magnet length or along the length of the magnet and the movement may be relatively longitudinal of the magnet or transverse to it, giving a wide range of initial position as well as of relative movements of the parts.

It will be noted that I provide for variation (to a limit of substantial neutralization) of the magnetic flux from paired magnets located in position to affect the needle, using magnetically permeable material to bridge or to alter their magnetic circuits. Relative change of position of magnetically permeable material with respect to any system of magnets would alter the distribution of the magnetism and would affect the needle, but it is necessary to arrange this alteration according to some definite order and plan so that the alteration may be made intelligently and may be most effective. The forms illustrated out of many which might be presented, have been illustrated for the purpose of advantageously controlling and directing the character of magnetic change which is made.

Notwithstanding that I have arranged all of the magnets shown in pairs in order to secure the best results from the neutralization or release of the free magnetic fields from the magnets I recognize that this principle affording an adjustable magnetically permeable return circuit for the stray field of a magnet or magnets is applicable to a single magnet affecting the needle and believe myself to be the first to utilize magnetically permeable material for a shield for the stray field from one magnet or from any number of magnet poles so that by varying the effectiveness of the shield I can offset the distortions of needle position due to an outside stray magnetic field.

In view of my invention and disclosure variations and modifications to meet individual whim or particular need will doubtless become evident to others skilled in the art, to obtain all or part of the benefits of my invention without copying the structure shown, and I, therefore, intend to cover all such in so far as they fall within the reasonable spirit and scope of my claims.

Having thus described my invention what I claim as new and desire to secure by Letters Patent is:—

1. In a device for adjusting a magnetic field at a compass, the combination with the compass of two sets of coupled magnets, one set acting at the compass at right angles to the other, an armature controlling the degree of coupling of the magnets of one set, a second armature controlling the degree of coupling of the magnets of the other set, and means for adjusting the positions of the armatures, the magnets of each set being coupled with one another in that they are to a considerable extent included in the same magnetic circuit and to an extent that is variant according to the position of the armature of the set.

2. In a device for adjusting a magnetic field, a pair of laterally spaced reversely directed stationary magnets, an armature and a rotatably mounted screw threading and adjustably positioning the armature to vary the external field from the pair.

3. In a device for modifying a magnetic field, magnetic material forming a magnetic circuit divided into four portions by non-magnetic gaps in combination with independently adjustable armatures by-passing the magnetic flux of alternating pairs of said portions and adapted to control the magnetic field from the circuit at a point some distance way from the circuit in directions perpendicular to each other.

4. In a device for adjusting a magnetic field at a compass, a pair of laterally spaced reversely directed magnets and a magnetic member extending transversely between and adjustable along the magnets.

5. A device for adjusting the magnetic field at a compass comprising two pairs of stationary reversely directed magnets in the same or parallel planes and an adjustable armature extending transversely between the magnets and adjustable along the magnets of each pair.

6. A device for adjusting the magnetic field at a compass comprising four relatively spaced magnets arranged in the sides of a quadrilateral with unlike poles adjacent and an armature between and adjustable along the magnets on opposite sides of the quadrilateral.

7. In a device for adjusting the magnetic field at a compass, two pairs of bar magnets placed symmetrically with respect to an intermediate axis and a magnetic by-pass between and adjustable along the magnets of each pair.

8. In a device for adjusting a magnetic field at a compass, two pairs of stationary substantially equal magnets having the magnet ends of each pair substantially symmetrical with respect to an axis through the compass, a magnetic member spanning the magnets of one pair, a second magnetic member spanning the magnets of the other pair and individual rotatable rods threading and positioning the respective members along their magnets.

9. In a device for adjusting a magnetic field at a compass, two sets of coupled magnets, one set acting at the compass at right angles to the other, an armature controlling the degree of coupling of the magnets of one set, a second armature controlling the degree of coupling of the magnets of the other set, and rotatable rods threading and positioning the respective armature, in combination with means operable at the face of the compass for rotatably adjusting the rods, two magnets being coupled when they have to considerable extent a common magnetic circuit.

10. In a device for adjusting a magnetic field at a compass or the like the combination with the compass of a pair of substantially equal magnets placed in coupled relation, an armature controlling by its position the coupled relation and means for varying the position of the armature with respect to the magnets in order to vary the effective strength of one of the magnets, the magnets being in coupled relation in that each is included in a major portion of the magnetic crcuit of the other.

11. In a device for adjusting a magnetic field, a member comprising a pair of laterally spaced reversely directed stationary magnets, an armature member adjustably short-circuiting the magnets and a rotatably mounted screw in threaded connection with and adjustably positioning one of the members to regulate an external field from the pair member.

12. In a device for adjusting the magnetic field at a compass or the like, the combination with the compass of a member comprising a pair of laterally spaced reversely directed magnets, a magnetic member extending transversely between the magnets and means for adjusting one member with respect to the other and along the other.

13. A device for adjusting the magnetic field at a compass or the like, the combination with the compass of means comprising two sets of magnetic adjusters, magnetically at right angles with one another, each set comprising a member consisting of a pair of stationary reversely directed magnets in a plane that is the same or parallel to the stationary reversely directed magnets of the other set and an armature member between the magnets, one of the members of each set being adjustable with respect to the other.

14. A device for adjusting the magnetic field at a compass or the like, the combination with the compass of means comprising two relatively perpendicular sets of magnetic adjusters, each set comprising two members of which one includes stationary reversely directed magnets in the same plane or parallel plane as the magnets of the other set and an armature between the magnets in combination with means for adjusting the relative positions of the members of each set.

15. In a device for adjusting a magnetic field at a compass or the like, a pair member of closely adjacent laterally spaced reversely directed magnets, an armature member between and spaced from the magnets and means for laterally adjusting one member with respect to the other.

16. The method of using magnets to adjust a magnetic field at a compass, which consists in variantly magnetically short-circuiting magnets by magnetic means outside of the magnets while maintaining the magnetic stationary to regulate their effect upon the field.

17. The method of using a plurality of magnets to adjust a magnetic field at a compass of the carrier of the compass, which consists in grouping the magnets in relatively perpendicular pairs near the compass, in alining the carrier in one direction, in adjustably short-circuiting the magnetic flux of the magnets having one alinement with respect to the carrier, in alining the carrier in a direction perpendicular to its first alinement and in adjustably short-circuiting the magnetic flux of the magnets having the other alinement with respect to the carrier.

18. In a compass, means for neutralizing the effect of a stray field comprising a pair of bar magnets spaced from each other with the unlike poles of each magnet adjacent each other, a cooperating ferromagnetic member arranged to move in a transverse axial direction in the space between said magnets, and means for moving said member toward one of said magnets and away from the other of said magnets to vary the magnetic strength of said magnets inversely with respect to each other thereby to provide the desired compensation.

19. In a compass, a compensating unit comprising a pair of permanent magnetic members spaced apart with their magnetic axes substantially parallel and with the poles of one magnet adjacent the poles of opposite polarity of the other magnet, a ferromagnetic shielding member arranged for movement in a direction at right angles to the magnetic axes of said magnets, and means for effecting motion of said shielding member into a position to screen one of said magnets and to nullify the magnetic effect thereof whereby the other of said magnets is caused to exert a desired compensating effect.

20. In a compass a compensating unit comprising a pair of permanent magnets spaced from each other with the poles of one magnet adjacent poles of opposite polarity of the other magnet, a cooperating ferromagnetic shielding member, arranged in the space between said magnets and means mounting said member for motion in a direction transverse to the magnetic axes of said magnets, the dimension of said member in the direction of its movement being less than the distance between said magnets whereby movements of the member to screen one of said members causes the other magnet to exert a desired compensating effect.

21. In a compass a pair of compensating units arranged in different horizontal planes, each of said units comprising a pair of permanent magnets spaced from each other in a transverse axial direction with the poles of one magnet adjacent the poles of unlike polarity of the other magnet a ferromagnetic shielding member and means for effecting a relative transverse axial movement between said member and said magnets for causing one of said magnets to predominate over the other to introduce a desired compensating effect, the magnets of one of said units being arranged at right angles with the magnets of the other unit whereby adjustment of one of said units effect compensation for one component of a stray field and adjustment of the other unit effects compensation for the component at right angles thereto.

22. In a compass, four bar magnets arranged in parallel planes so that their projections on a plane parallel to said first mentioned plane form the sides of a square each corner of which comprises a pair of poles of like polarity, the pairs of poles comprising the opposite sides of the square being arranged in different parallel planes, a separate ferromagnetic member arranged to cooperate with each pair of said magnets, means for effecting relative movement between one of said pair of magnets and one of said members to provide compensation for one component of a stray field, and means for effecting relative movement between the other pair of magnets and the remaining member at right angles to said first mentioned movement to provide compensation for the component of said field at right angles with said first mentioned component.

23. A device for compensating magnetic compasses, comprising two sets of magnets, one set being at right angles to the other, magnetic means for magnetically screening said magnet, and means for controlling from the same location the magnetically screening effect of said screening means on said magnets in directions at right angles to each other to adjust the compensating effect of said magnets.

24. An apparatus for neutralizing external influences on a given magnetic field, comprising means having a plurality of magnetic fields, magnetic means magnetically screening the fields associated with said plurality of fields, and means for controlling from the same location the magnetically screening effect of said screening means on said plurality of fields in directions at right angles to each other to adjust the compensating effect of said plurality of fields.

25. A device for compensating magnetic compasses, comprising a casing, two sets of coupled magnets supported in said casing, one set being at right angles to the other, magnetic means for magnetically screening said magnets, and a pair of rotatable parallel shafts for controlling the magnetically screening effect of said screening means on said magnets in directions at right angles to each other from the same side of the casing to adjust the compensating effect of the magnets.

26. An apparatus for compensating semi-circular deviation of a magnetic compass, comprising the combination with a magnetic compass, magnets on opposite sides of the axis of the compass at substantially the same height with respect to the compass, magnetic material movable with respect to the magnets and substantially in contact with them to alter the strength and direction of the composite magnetic field of the magnets by variantly weakening the magnets, and magnetic means displaced 90° with respect to the magnets and substantially at the same height with respect to the compass as the magnets, for providing variant correction for the compass in a position perpendicular to the position for correction by the magnets.

27. The method of using a plurality of magnets to adjust a magnetic field at a compass, which consists in grouping the magnets on opposite sides of the compass axis, substantially at the same height with respect to the compass and in relatively perpendicular positions one group to another, in alining the compass substantially with one group of magnets, in varying the strength of one of the magnets of this group, by moving magnetic material substantially in engagement with it to variantly affect its free magnetic field until the compass is adjusted in this position, in alining the compass substantially with the second group of magnets and in repeating the operation with the second group of magnets to complete the correction of the compass.

JOHN L. H. HAND.